United States Patent
DiCarlo et al.

(10) Patent No.: US 10,317,173 B2
(45) Date of Patent: Jun. 11, 2019

(54) DUAL ADJUSTABLE MOUNTING SHOE

(71) Applicant: KNIGHTVISION, LLLP, Titusville, FL (US)

(72) Inventors: Joseph DiCarlo, Chester, NH (US); Robert J. McCreight, Jr., San Antonio, TX (US)

(73) Assignee: KNIGHTVISION, LLLP, Titusville, FL (US)

( * ) Notice: Subject to any disclaimer, the term of this patent is extended or adjusted under 35 U.S.C. 154(b) by 0 days.

(21) Appl. No.: 15/498,302

(22) Filed: Apr. 26, 2017

(65) Prior Publication Data

US 2017/0248389 A1 Aug. 31, 2017

Related U.S. Application Data

(63) Continuation-in-part of application No. 14/755,145, filed on Jun. 30, 2015, now abandoned, which is a continuation of application No. 13/896,721, filed on May 17, 2013, now Pat. No. 9,121,544.

(60) Provisional application No. 61/768,002, filed on Feb. 22, 2013.

(51) Int. Cl.
 *F41G 11/00* (2006.01)
 *F16M 11/04* (2006.01)
 *F16M 13/00* (2006.01)

(52) U.S. Cl.
 CPC ......... *F41G 11/003* (2013.01); *F16M 11/041* (2013.01); *F16M 13/00* (2013.01); *F41G 11/007* (2013.01); *Y10T 29/49826* (2015.01)

(58) Field of Classification Search
 CPC ... F41G 11/003; F41G 11/007; F16M 11/041; F16M 13/00
 See application file for complete search history.

(56) References Cited

U.S. PATENT DOCUMENTS

| | | | | |
|---|---|---|---|---|
| 1,816,195 A | * | 7/1931 | Redfield | F41G 11/003 42/125 |
| 2,306,997 A | * | 12/1942 | Burrell | F41G 11/003 42/126 |
| 2,528,080 A | * | 10/1950 | Robertson | F41G 11/003 42/127 |

(Continued)

OTHER PUBLICATIONS

U.S. Appl. No. 13/896,640, filed May 17, 2013.

(Continued)

*Primary Examiner* — Anita M King
(74) *Attorney, Agent, or Firm* — Hayes Soloway P.C.

(57) ABSTRACT

A dual-adjustable mounting shoe has a shoe body. A middle portion of the shoe body has at least one pocket formed therein. At least one pocket insert is positioned at least partially within the pocket. The pocket insert has a raised tooth positioned along a rear of the shoe body and a forward edge positioned along a front of the shoe body, wherein the at least one pocket insert is movable relative to the shoe body to adjust a position of at least one of the raised tooth and the forward edge relative to the shoe body. At least one fastener is engageable with the at least one pocket insert to secure the at least one pocket insert in a stationary position at least partially within the pocket. The dual-adjustable mounting shoe is usable with both a rear-indexing receptacle and a forward-indexing receptacle.

18 Claims, 13 Drawing Sheets

(56) References Cited

U.S. PATENT DOCUMENTS

| | | | |
|---|---|---|---|
| 2,585,985 A * | 2/1952 | Anderson | F41G 11/007 248/201 |
| 3,405,448 A * | 10/1968 | Weatherby | F41G 11/003 42/127 |
| 3,628,761 A | 12/1971 | Thomas | |
| 4,205,473 A * | 6/1980 | Wilson | F41G 11/006 42/127 |
| 4,570,887 A * | 2/1986 | Banister | F16M 11/041 248/187.1 |
| 4,899,479 A | 2/1990 | Sanders | |
| 4,929,973 A | 5/1990 | Nakatani | |
| 5,236,169 A | 8/1993 | Johnsen | |
| 5,307,204 A | 4/1994 | Dor | |
| 5,331,459 A | 7/1994 | Dor | |
| 5,339,464 A | 8/1994 | Dor | |
| 5,388,359 A | 2/1995 | DeWitt | |
| D358,830 S | 5/1995 | Dor | |
| 5,707,036 A | 1/1998 | Dunbar | |
| 5,914,816 A | 6/1999 | Soto et al. | |
| 6,019,329 A | 2/2000 | Edelstein | |
| 6,196,504 B1 | 3/2001 | Lemke | |
| 6,457,179 B1 | 10/2002 | Prendergast | |
| 6,472,776 B1 | 10/2002 | Soto et al. | |
| D483,650 S | 12/2003 | Squillante | |
| 6,751,810 B1 | 6/2004 | Prendergast | |
| 6,773,172 B1 | 8/2004 | Johnson et al. | |
| 6,811,348 B1 | 11/2004 | Meyer et al. | |
| 6,862,748 B2 | 3/2005 | Prendergast | |
| 6,938,276 B1 | 9/2005 | Prendergast | |
| 6,957,449 B2 | 10/2005 | Prendergast | |
| 6,986,162 B2 | 1/2006 | Soto et al. | |
| 7,219,370 B1 | 5/2007 | Teetzel et al. | |
| 7,418,738 B2 | 9/2008 | Prendergast | |
| 7,444,683 B2 | 11/2008 | Prendergast et al. | |
| 7,504,918 B2 | 3/2009 | Prendergast et al. | |
| 7,649,701 B2 | 1/2010 | Prendergast et al. | |
| 7,658,556 B2 | 2/2010 | Johnson | |
| 7,735,159 B2 | 6/2010 | Prendergast | |
| 7,811,024 B2 * | 10/2010 | Vendetti | F41G 11/003 403/381 |
| 7,823,316 B2 | 11/2010 | Storch et al. | |
| 7,996,917 B2 | 8/2011 | Prendergast | |
| 8,011,629 B2 | 9/2011 | Herskovic | |
| 8,238,045 B2 | 8/2012 | Prendergast et al. | |
| 8,239,971 B2 | 8/2012 | Prendergast | |
| 8,337,036 B2 | 12/2012 | Soto et al. | |
| 8,739,313 B2 | 6/2014 | Teetzel et al. | |
| 9,121,544 B2 | 9/2015 | DiCarlo | |
| 9,249,923 B2 | 2/2016 | DiCarlo | |
| 9,958,667 B2 * | 5/2018 | DiCarlo | A42B 3/042 |
| 2014/0239146 A1 | 8/2014 | DiCarlo | |
| 2015/0198421 A1 * | 7/2015 | Crispin | F41G 11/006 42/126 |

OTHER PUBLICATIONS

U.S. Appl. No. 13/896,721, filed May 17, 2013.
U.S. Appl. No. 14/755,145, filed Jun. 30, 2015.
Notice of Allowance issued in U.S. Appl. No. 13/896,640, dated Sep. 29, 2015 (8 pgs).
Notice of Allowance issued in U.S. Appl. No. 13/896,721, dated Jun. 5, 2015 (5 pgs).
Office Action issued in U.S. Appl. No. 13/896,640, dated Feb. 27, 2015 (9 pgs).
Office Action issued in U.S. Appl. No. 13/896,721, dated Dec. 18, 2014 (15 pgs).
Office Action issued in U.S. Appl. No. 14/755,145, dated Jan. 27, 2017 (9 pgs).

* cited by examiner

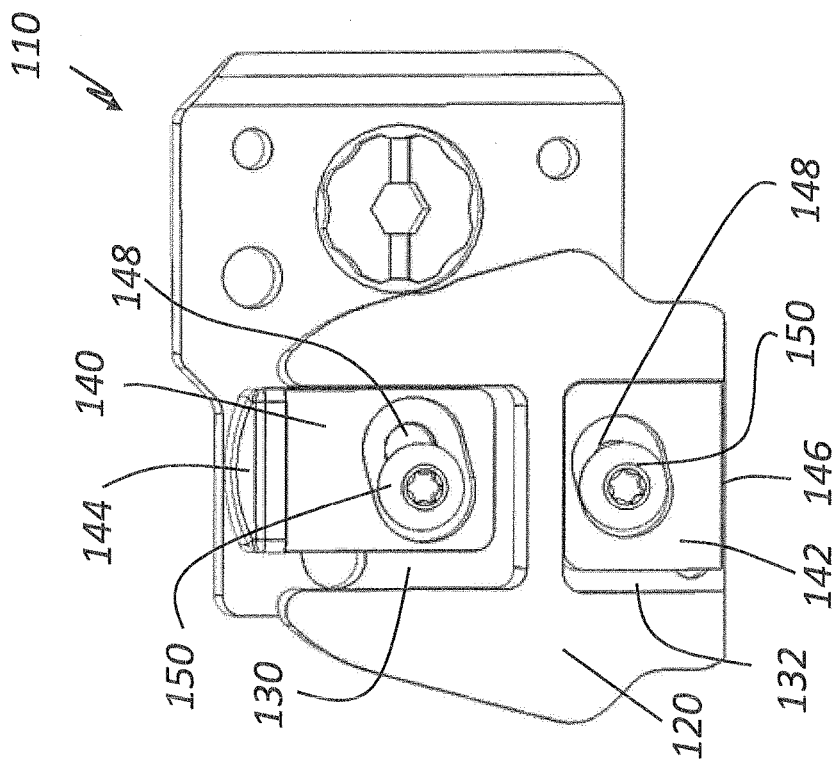
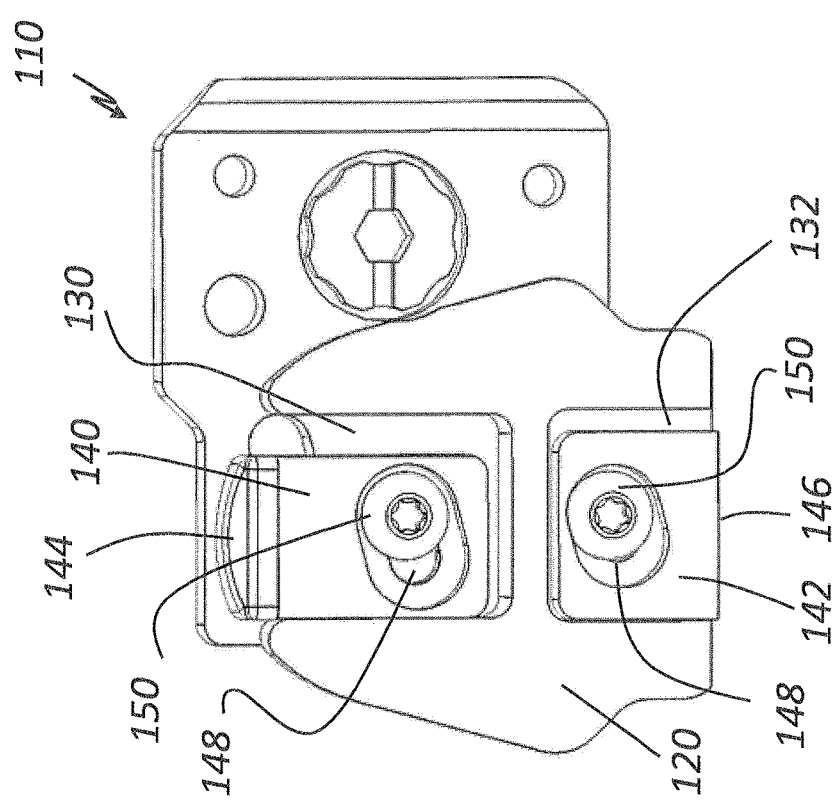

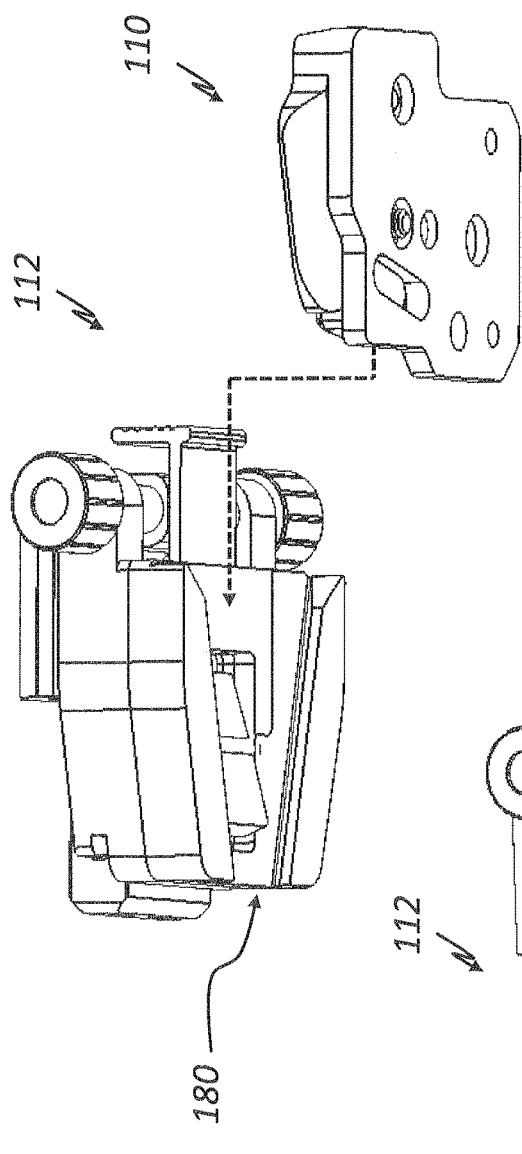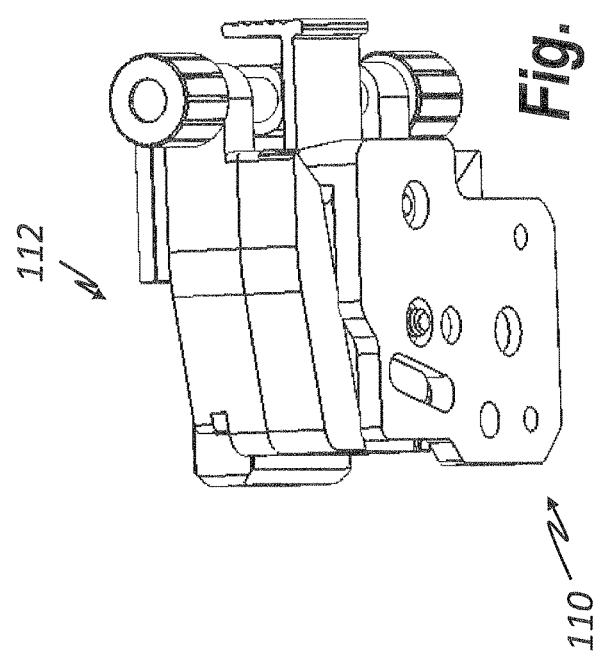

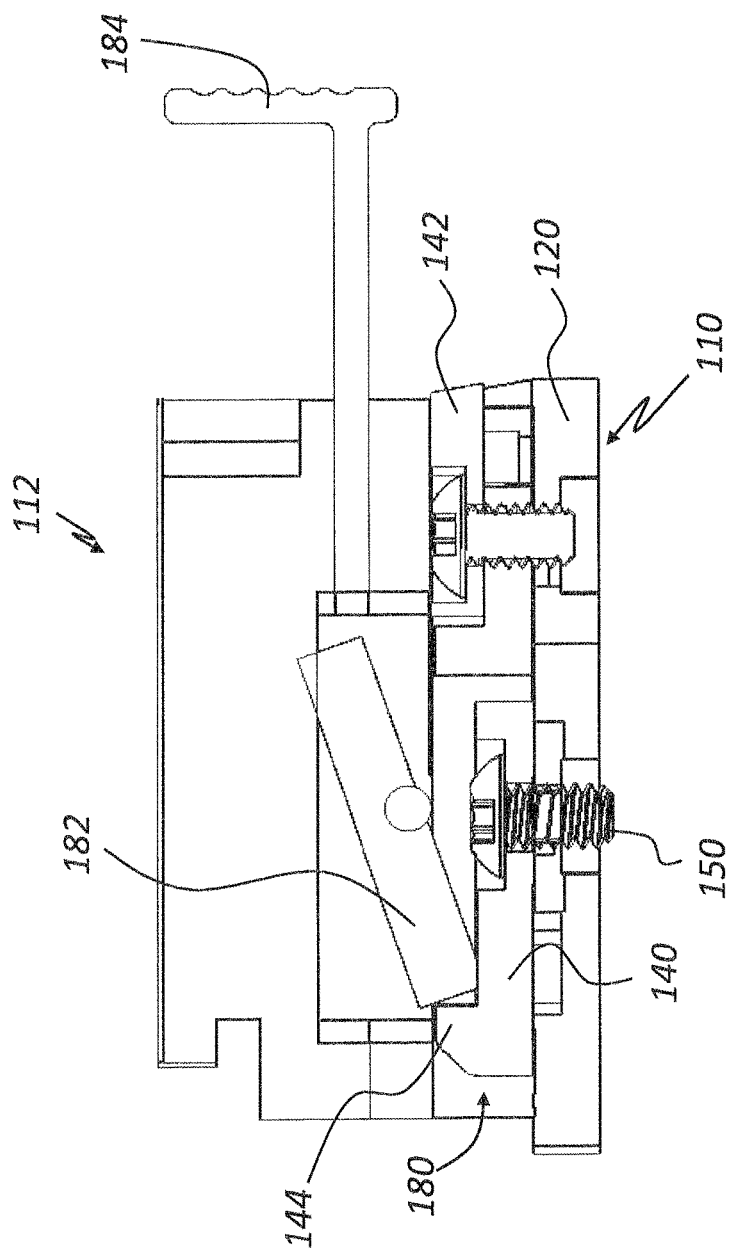

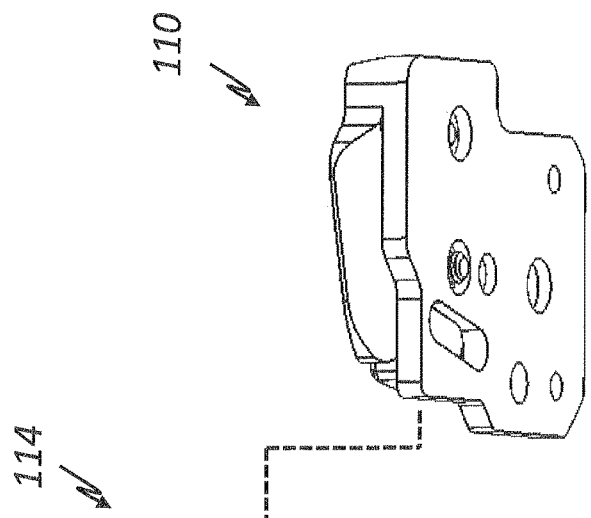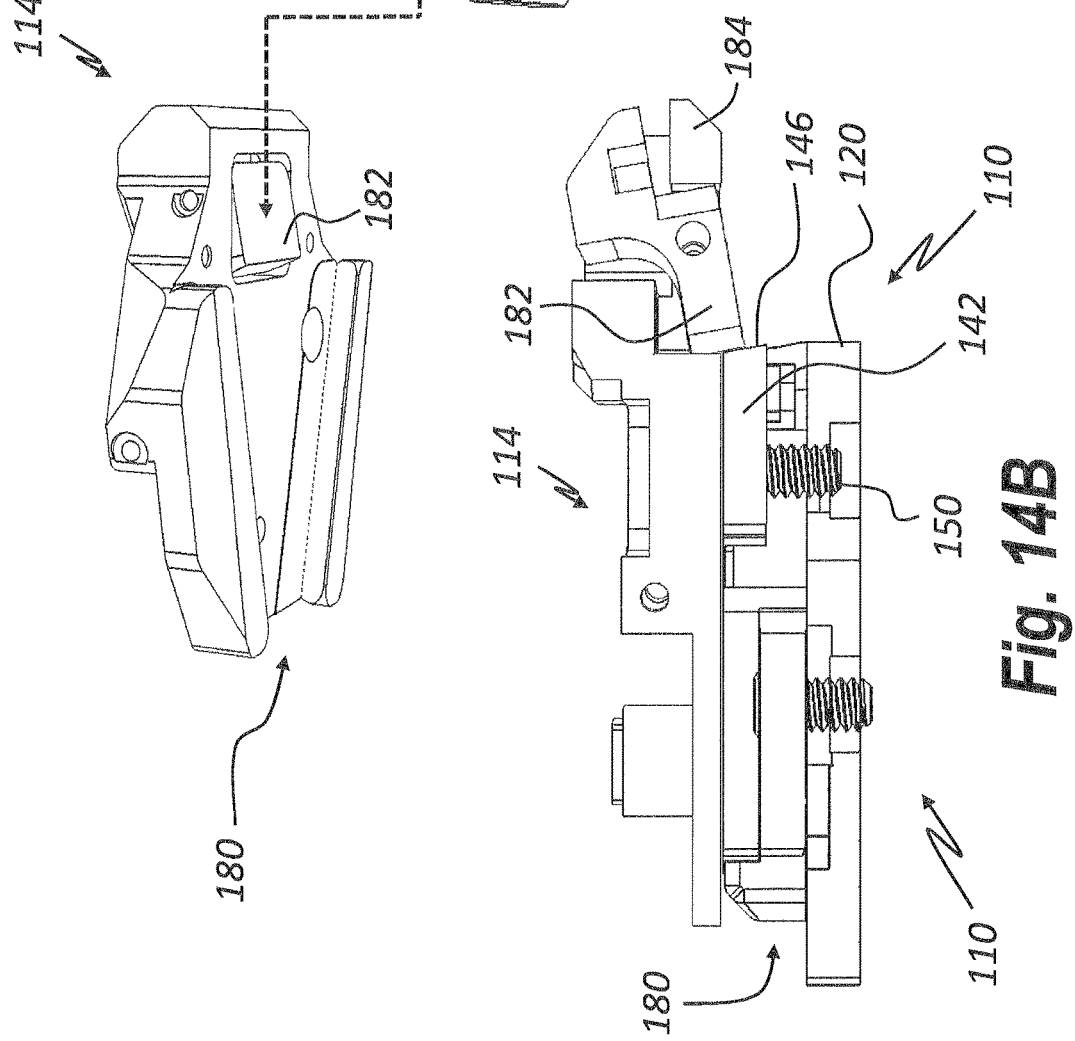
Fig. 14A
Fig. 14B

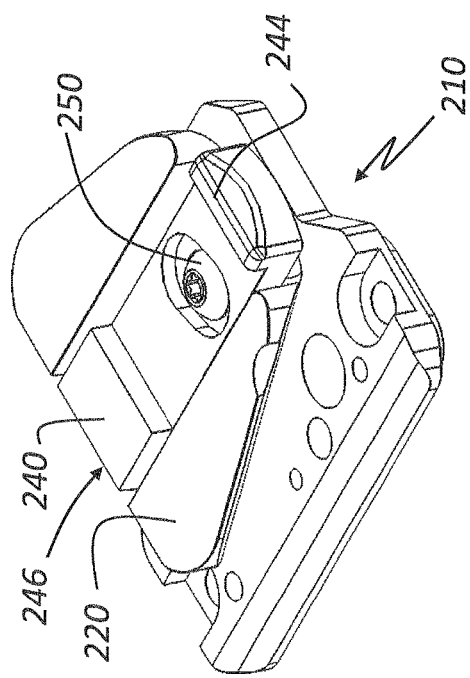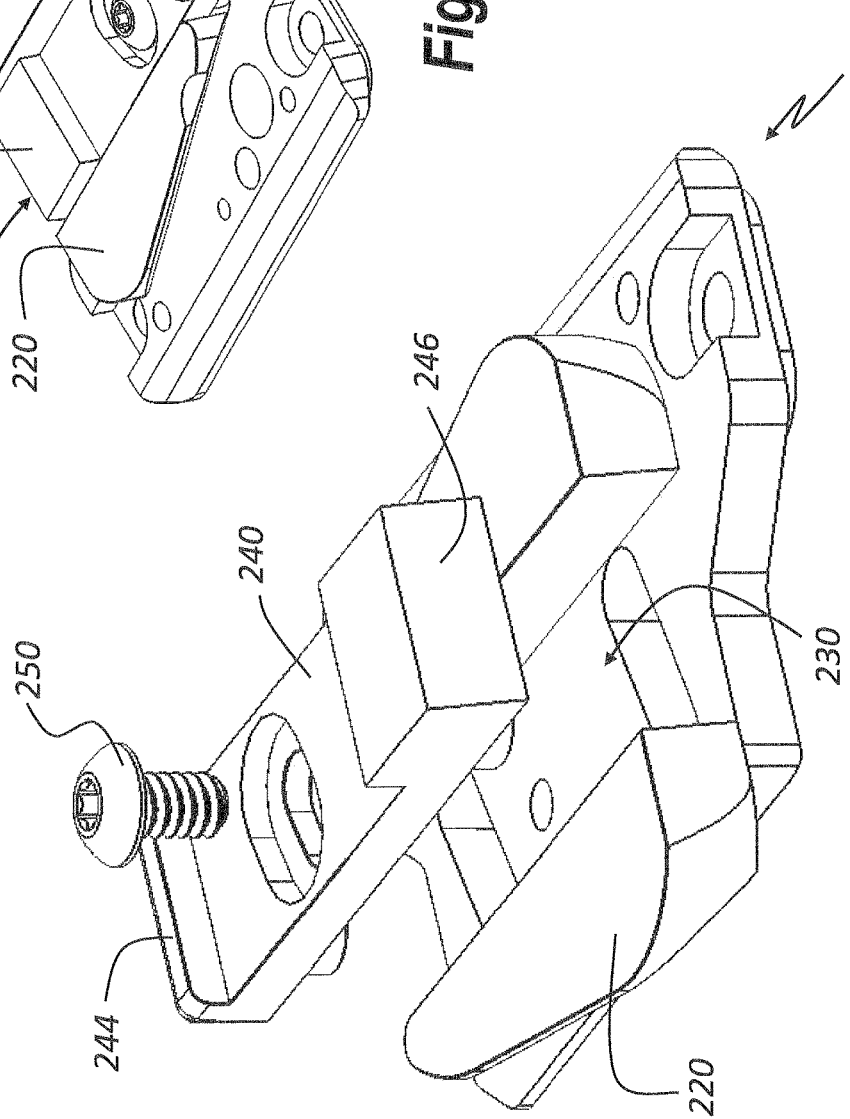

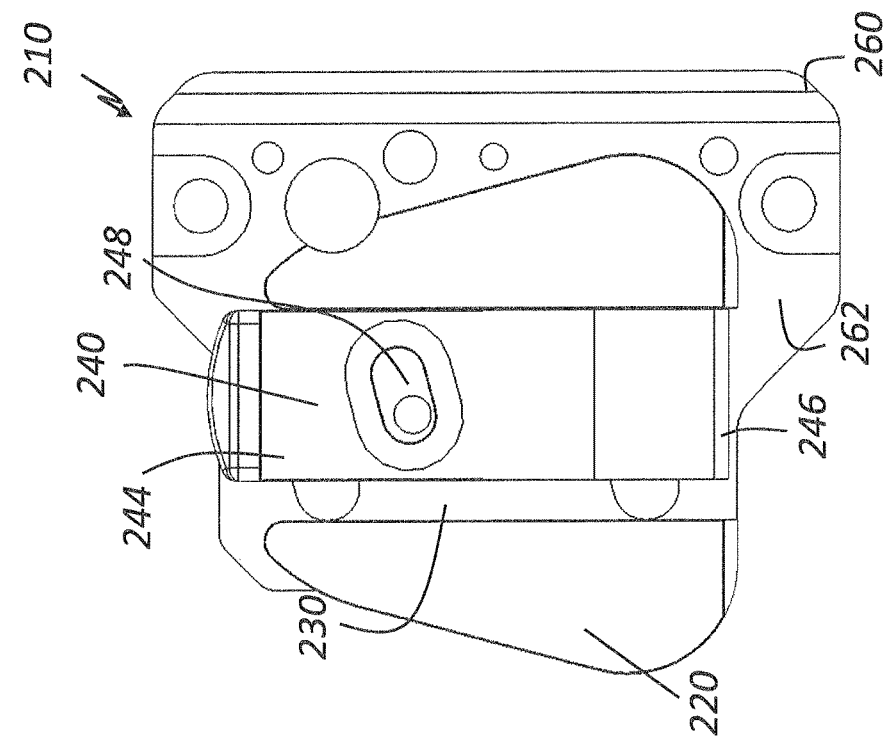
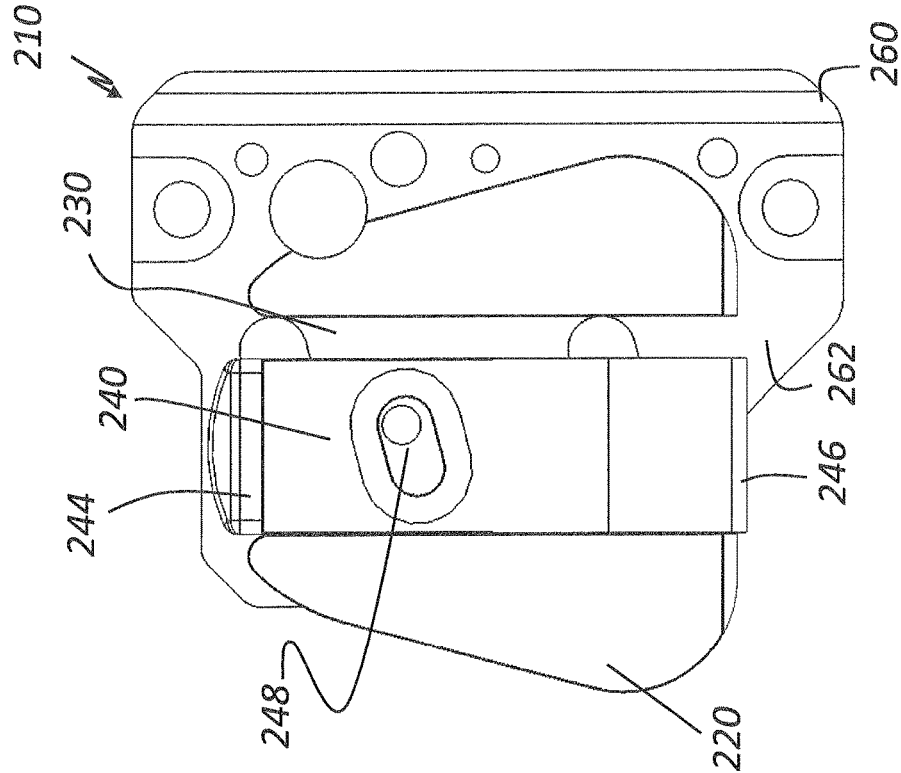

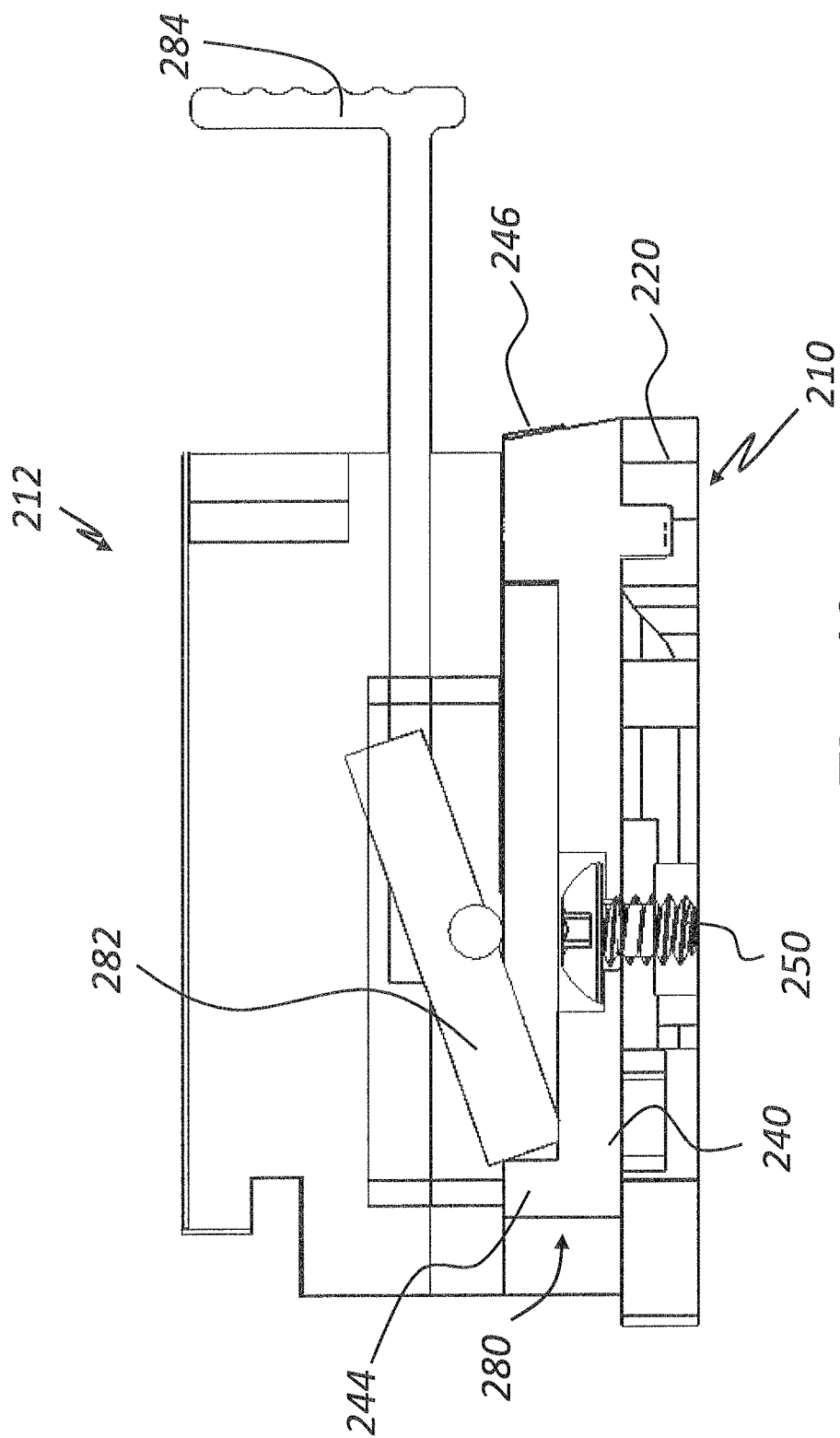

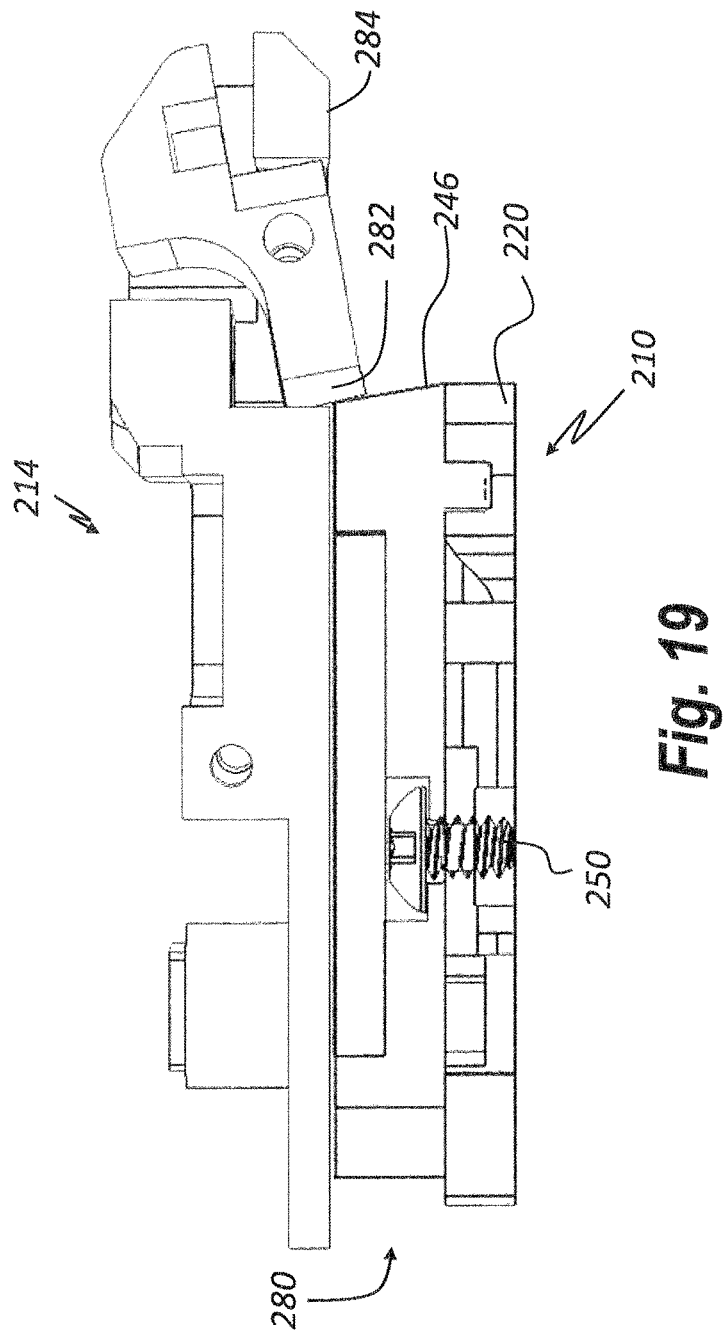

DUAL ADJUSTABLE MOUNTING SHOE

CROSS REFERENCE TO RELATED APPLICATION

This application is a Continuation-in-Part of U.S. application Ser. No. 14/755,145 entitled, "Adjustable Mounting Shoe and Related Methods Thereof" filed Jun. 30, 2015, which is a Continuation to U.S. Ser. No. 13/896,721 entitled, "Adjustable Mounting Shoe and Related Methods Thereof" filed May 17, 2013, now U.S. Pat. No. 9,121,544, issued Sep. 1, 2015, which claims benefit of U.S. Provisional Application Ser. No. 61/768,002, entitled, "Optical Device Mounting Apparatus and Adjustable Mounting Shoe" filed Feb. 22, 2013, the entire disclosures of which is incorporated herein by reference.

FIELD OF THE DISCLOSURE

The present disclosure is generally related to mounting devices and more particularly is related to a dual-adjustable mounting shoe and related methods thereof.

BACKGROUND OF THE DISCLOSURE

Optical devices are commonly used in various environments to enhance the capabilities of the user's vision. In military environments, various optical devices are used to give a soldier enhanced visibility in limited conditions. For example, devices like the PVS 14 night vision monocular are commonly used in the military to enhance a soldier's visibility in low light conditions. These optical devices are affixed to combat helmets, weapons, or other structures that a soldier uses, and during a field operation, a soldier may move the optical device between the various mounting structures.

The use of a mounting shoe to secure an optical device to a mounting structure, such as a combat helmet or a weapon, is well-known in the art. FIGS. 1-3 are illustrations of an optical device mounting system, in accordance with the prior art. As is shown, the optical device 10 has a mounting shoe 20 secured thereto, such as with fastener 22. A pocket 30 is formed within the mounting shoe 20 (FIG. 1). The mounting shoe 20 engages with a receiver 40 of a mounting structure 50, as may be positioned on a combat helmet or weapon. A locking arm 60 protrudes into the receiver 40 such that when the mounting shoe 20 is engaged with the receiver 40, the locking arm 60 engages with the pocket 30 to securely retain the mounting shoe 20 within the receiver 40. To disengage the mounting shoe 20 from the receiver 40, the locking arm 60 may be withdrawn from engagement with the pocket 30, such as with buttons 70.

The optical device mounting system shown in FIGS. 1-3 is one type of mounting system—many others exist within the art. The shoe may have various designs, depending on the mounting structure the optical device is mounted to, and it is beneficial for the various designs of the shoe to be interchangeable with different mounts. Conventional shoes are commonly static, unitary structures with a dovetail shape and a plurality of angled sidewalls which allow the shoe to engage with a receiver. FIG. 4 is an image of a conventional mounting shoe 20, in accordance with the prior art. As is shown, the mounting shoe 20 has a dovetail shape with angled sidewalls, and a pocket 30 is formed in the center portion of the shoe 20.

While mounting shoes 20 are generally similar in size and shape, the receivers 40 in which they're engaged can vary in design. FIGS. 5A-5B are images of conventional receivers 40, in accordance with the prior art. Generally, receivers 40 are usually either utilize rear-engagement or forward-engagement to engage with mounting shoes 20, where the term 'rear' refers to the narrow end of the mounting shoe 20 and the term 'forward' refers to the wide end of the mounting shoe 20. For example, receiver 40A shown in FIG. 5A is a rear-engagement receiver, where the extended end 62 of the locking arm 60 makes contact with a raised tooth 32 along the edge of the pocket 30 at the rear side 24 of the mounting shoe 20. In contrast, FIG. 5B illustrates a forward-engagement receiver 40B, where the extended end 62 of the locking arm 60 makes contact with a forward edge 34 of the mounting shoe 20 along its forward side 26. As can be seen comparing FIGS. 5A-5B, the rear-engagement receiver 40A has a locking arm 60 which is positioned generally between the angled sides of the receiver 40A, whereas the locking arm 60 of the forward-engagement receiver 40B is positioned substantially in front of the space between the angled sides of the receiver 40B.

The use of forward or rear-engagement receivers may vary depending on the intended use of the mount. For example, the forward-engagement design is often used with receivers that use a locking arm or a butterfly clip commonly used to mount optical devices to weapons which may be exposed to heightened forces when the weapon is discharged. The rear-engagement design is often used with mounting optical devices to a combat helmet, which experiences less force. When a butterfly clip is used to engage a shoe along its forward edge, the mounting shoe may have an angled back surface, such as a 10° angle along the forward edge (at the wide end of the dovetail shape) to engage with a butterfly clip when the shoe is inserted into the mounting receiver. When a retractable locking arm is used with the receiver, as is shown in FIGS. 5A-5B, the shoe with the pocket is secured within the mounting receiver with a retractable locking mount which moves either into the pocket to engage with the shoe or along the forward edge of the shoe to engage with it.

While both types of shoe-engagements have been used for some time, manufacturing a shoe that is successful with both the forward-engagement and the rear-engagement has proved difficult. The shoe must be manufactured with extremely precise tolerances to allow the shoe to engage with the mounting receiver properly. Often times, a shoe with both types of engagement may fit with the forward-engagement but it will not fit with the rear-engagement, or vice versa. It is often difficult for manufactures to control the tolerances needed for the butterfly clip engagement, and failing to do so can prevent proper mounting of the optical device. For example, if the tolerance between the angled edge of the shoe and a forward-engagement locking arm or butterfly clip is too large, the shoe may be too loose within the mounting receiver, whereas if the tolerance is too small, the shoe may not lock within the mounting receiver at all, or the locking arm or butterfly clip may become jammed and not allow the shoe to be released.

Thus, a heretofore unaddressed need exists in the industry to address the aforementioned deficiencies and inadequacies.

SUMMARY OF THE DISCLOSURE

Embodiments of the present disclosure provide a dual-adjustable mounting shoe. Briefly described, in architecture, one embodiment of the dual-adjustable mounting shoe, among others, can be implemented as follows. The dual-adjustable mounting shoe has a shoe body. A middle portion of the shoe body has at least one pocket formed therein. At least one pocket insert is positioned at least partially within the pocket. The pocket insert has a raised tooth positioned along a rear of the shoe body and a forward edge positioned along a front of the shoe body, wherein the at least one pocket insert is movable relative to the shoe body to adjust a position of at least one of the raised tooth and the forward edge relative to the shoe body. At least one fastener is engageable with the at least one pocket insert to secure the at least one pocket insert in a stationary position at least partially within the pocket.

The present disclosure can also be viewed as providing a dual-adjustable mounting shoe. Briefly described, in architecture, one embodiment of the dual-adjustable mounting shoe, among others, can be implemented as follows. The dual-adjustable mounting shoe has a shoe body. A middle portion of the shoe body has a rear pocket and a forward pocket formed therein. A first pocket insert is positioned at least partially within the rear pocket. The first pocket insert has a raised tooth positioned along a rear of the shoe body, wherein the first pocket insert is movable relative to the shoe body to adjust a position of the raised tooth relative to the shoe body. A second pocket insert is positioned at least partially within the forward pocket. The second pocket insert has a forward edge positioned proximate to a front edge of the shoe body, wherein the second pocket insert is movable relative to the shoe body to adjust a position of the forward edge relative to the shoe body. At least one fastener is engageable with each of the first and second pocket inserts, respectively, to secure the first and second pocket inserts in a stationary position at least partially within the pocket.

The present disclosure can also be viewed as providing an adjustable optical device mount. Briefly described, in architecture, one embodiment of the dual-adjustable optical device mount, among others, can be implemented as follows. The dual-adjustable mounting shoe has a dovetail-shaped shoe body having a rear side and a forward side. At least one pocket insert is movably securable within a pocket formed in a middle portion of the dovetail-shaped shoe body, wherein a position of the at least one pocket insert along the rear side and the forward side of the dovetail-shaped shoe body is adjustable.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 11A-11B are top view illustrations of the dual-adjustable mounting shoe showing different pocket insert positions, in accordance with the first exemplary embodiment of the present disclosure.

FIGS. 12A-12B are bottom perspective views of the dual-adjustable mounting shoe and a rear-indexing receptacle, in accordance with the first exemplary embodiment of the present disclosure.

FIG. 13 is a side cross-sectional view of the dual-adjustable mounting shoe and a rear-indexing receptacle, in accordance with the first exemplary embodiment of the present disclosure.

FIGS. 14A-14B are a bottom perspective view and side cross-sectional view of the dual-adjustable mounting shoe and a forward-indexing receptacle, in accordance with the first exemplary embodiment of the present disclosure.

FIG. 15 is an angled side view illustration of a dual-adjustable mounting shoe, in accordance with a second exemplary embodiment of the present disclosure.

FIG. 16 is an isometric, exploded view illustration of the dual-adjustable mounting shoe of FIG. 15, in accordance with the second exemplary embodiment of the present disclosure.

FIGS. 17A-17B are top view illustrations of the dual-adjustable mounting shoe showing the pocket insert in different positions, in accordance with the second exemplary embodiment of the present disclosure.

FIG. 18 is a side cross-sectional view of the dual-adjustable mounting shoe and a rear-indexing receptacle, in accordance with the second exemplary embodiment of the present disclosure.

FIG. 19 is a side cross-sectional view of the dual-adjustable mounting shoe and a forward-indexing receptacle, in accordance with the second exemplary embodiment of the present disclosure.

DETAILED DESCRIPTION

Figure 7:
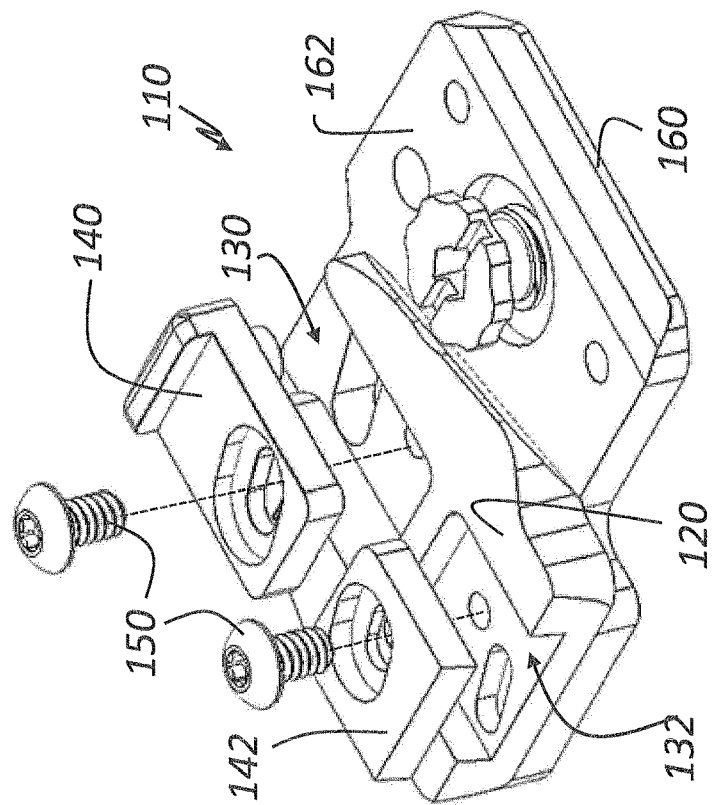
FIG. 7 is an isometric, exploded view illustration of the dual-adjustable mounting shoe of FIG. 6, in accordance with the first exemplary embodiment of the present disclosure.
Figure 6:
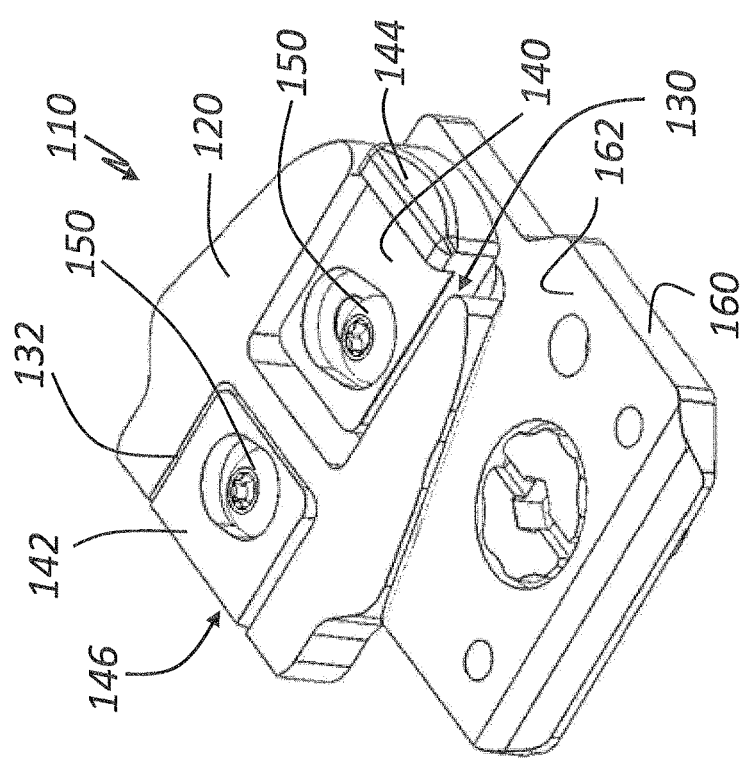
FIG. 6 is an isometric view illustration of a dual-adjustable mounting shoe, in accordance with a first exemplary embodiment of the present disclosure.
Figure 9:
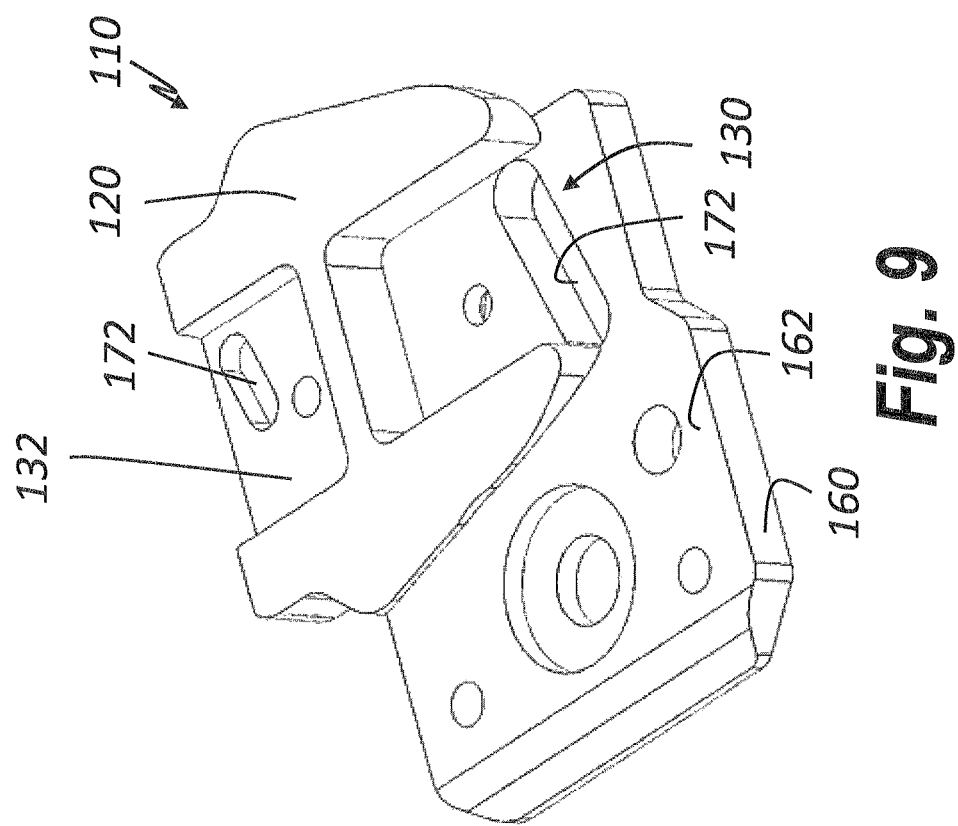
FIG. 9 is an isometric view illustration of the dual-adjustable mounting shoe of FIG. 6 shown without the pocket inserts, in accordance with the first exemplary embodiment of the present disclosure.
Figure 8:
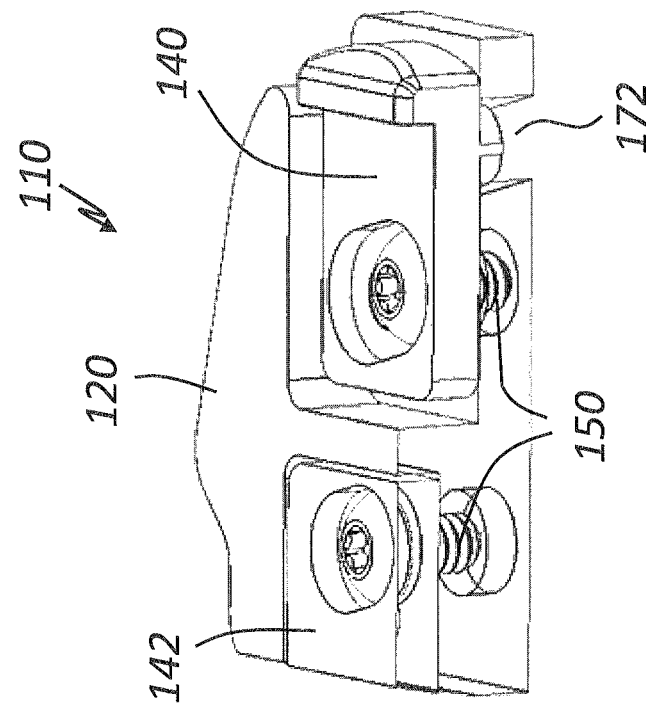
FIG. 8 is a cross-sectional view illustration of the dual-adjustable mounting shoe of FIG. 6, in accordance with the first exemplary embodiment of the present disclosure.

FIG. 6 is an isometric view illustration of a dual-adjustable mounting shoe, in accordance with a first exemplary embodiment of the present disclosure. FIG. 7 is an isometric, exploded view illustration of the dual-adjustable mounting shoe of FIG. 6, in accordance with the first exemplary embodiment of the present disclosure. FIG. 8 is a cross-sectional view illustration of the dual-adjustable mounting shoe of FIG. 6, in accordance with the first exemplary embodiment of the present disclosure. FIG. 9 is an isometric view illustration of the dual-adjustable mounting shoe of FIG. 6 shown without the pocket inserts, in accordance with the first exemplary embodiment of the present disclosure.

FIGS. 10A-10D are various isometric views of the rear and forward pocket inserts of the dual-adjustable mounting shoe, in accordance with the first exemplary embodiment of the present disclosure.

With reference to FIGS. 6-10D, the dual-adjustable mounting shoe 110, which may be referred to herein simply as 'shoe 110' includes a shoe body 120. A middle portion of the shoe body 120 has at least one pocket formed therein, which may commonly include first and second pockets 130, 132. At least one pocket insert is positioned at least partially within the at least one pocket, which may commonly include first and second pocket inserts 140, 142 being positioned within the first and second pockets 130, 132, respectively. The first pocket insert 140 may be positioned along the rear end of the shoe body 120, which is recognized as the narrow end of a dovetail-shaped shoe body 120, and includes a raised tooth 144 which is substantially positioned at the rear end of the wherein the pocket insert 140. The second pocket insert 142 may be positioned towards the forward end of the shoe body 120, which is recognized as the wider end of the dovetail-shaped shoe body 120, e.g., on an opposing side of the shoe body 120 from the narrow end. The second pocket insert 142 may have a forward edge 146 which is positioned proximate to the front or forward edge of the shoe body. Each of the first and second shoe inserts 140, 142 are movable relative to the shoe body 120. At least one fastener 150 is engageable with each of the first and second pocket inserts 140, 142, respectively, to secure the first and second pocket inserts 140, 142 in a stationary position at least partially within the pockets 130, 132.

The shoe 110 may be used to retain mountable devices, such as optical devices, to a mounting structure, such as combat helmets, weapons, or other structures. The shoe 110 can be used with a variety of different optical devices that are well-known in the art, such as, for example, the PVS 14 night vision monocular, thermal optical devices, fusion optical devices, or others, which are not depicted herein for simplicity in disclosure, but are understood to be capable of being mounted using the dual-adjustable mounting shoes disclosed herein. The shoe body 120 may be formed from a rigid, durable material, such as a metal or alloy, and generally has a dovetail shape where the forward or front side of the shoe body 120 is wider than the opposite side, commonly denoted as the rear side, however other shaped shoe bodies 120 may be possible.

As is shown in FIGS. 6-9, the pockets 130, 132 are formed in the middle section of the shoe body 120 such that the shoe body 120 forms at least some of the edges of the pockets 130, 132. The pockets 130, 132 may have a variety of shapes, sizes, and depths. For example, the pockets 130, 132 may have a rectangular shape formed by edge walls of the shoe body 120 with one or more open edges formed where the shoe body 120 is absent. The base of the pockets 130, 132 may be a closed surface which is either integral with the shoe body 120 or affixed to the shoe body 120. For example, some shoe bodies 120 may have a structure that provides the pockets 130, 132 a base surface, while other shoe bodies 120 may be used with other mounting components, such as base plates, to provide the base surface of the pockets 130, 132. FIGS. 6-9 illustrate the shoe body 120 with a base plate. The shoe body 120 may also include a separation wall positioned between the pockets 130, 132 which may provide for adequate material support of the shoe body 120 under working conditions, e.g., so the specific angular edges of the shoe body 120 do not inadvertently flex or move.

The pocket inserts 140, 142 may each be a unitary structure that is sized to fit at least partially within one or more of the pockets 130, 132. For example, the first pocket insert 140 may be sized to be positioned within the first pocket 130 and the second pocket insert 142 may be sized to fit within the second pocket 132. When the pocket inserts 140, 142 are secured within the pockets 130, 132, the combination of the shoe body 120 and pocket inserts 140, 142 allow the shoe 110 to function with existing mounting structures, such as helmet and weapon mounting structures used conventionally. The pocket inserts 140, 142 may be formed from the same material as the shoe body 120, commonly metals and alloys with coatings to ensure longevity in use. The pocket inserts 140, 142 are each adjustable or movable within the pockets 130, 132, respectively, relative to the shoe body 120. For example, the first pocket insert 140 may have a number of different positions that it can be placed in while secured within the first pocket 130, to allow the raised tooth 144 of the first pocket insert 140 to be located at varying positions relative to the shoe body 120. Similarly, the second pocket insert 142 may be movable within the second pocket 132 to allow the forward edge 146 of the second pocket insert 142 to be adjustable in location relative to the front edge of the shoe body 120 itself. This adjustability of the position of the pocket inserts 140, 142 allows the shoe 110 to be used with a wide range of mounting structures, since the pocket inserts 140, 142 can be positioned and re-positioned to correctly fit a particular mounting structure.

The at least one fastener 150 allows the pocket inserts 140, 142 to be secured within the pockets 130, 132. The fastener 150 may be a threaded fastener that engages with the pocket inserts 140, 142, such as by being positioned within a hole within the pocket inserts 140, 142, and connects with another structure to secure the pocket inserts 140, 142 within the pockets 130, 132, respectively. The other structure that the fastener 150 engages with may vary, depending on the design of the shoe 110. For example, the fastener 150 may commonly engage with a base of the pockets 130, 132, which is formed either by the shoe body 120 or another mounting component, such as a base plate. Other configurations of the fastener 150 are available, including those where the fastener 150 is engaged between the pocket inserts 140, 142 and other portions of the shoe body 120, such as the walls of the shoe body 120 that form the pockets 130, 132. The fastener 150 allows the pocket inserts 140, 142 to be removably secured within the pockets 130, 132. In other words, the pocket inserts 140, 142 can be retained stationary within the pockets 130, 132 by the fastener 150 in one position, and then the fastener 150 can be loosened to move the pocket inserts 140, 142 into another position.

Figure 1:
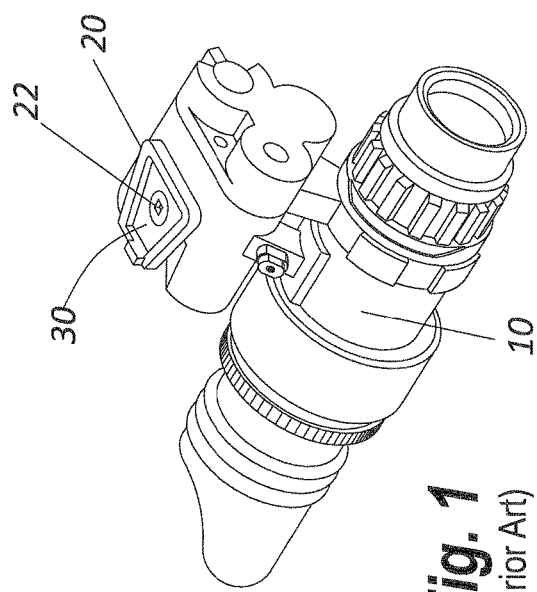
FIGS. 1-3 are illustrations of an optical device mounting system, in accordance with the prior art.
Figure 3:
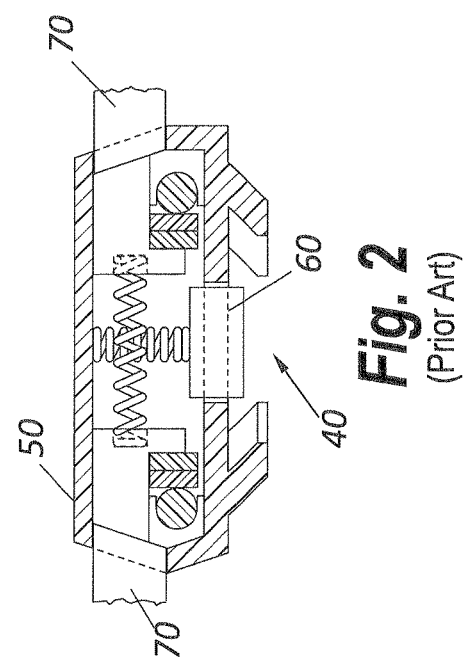
Figure 2:
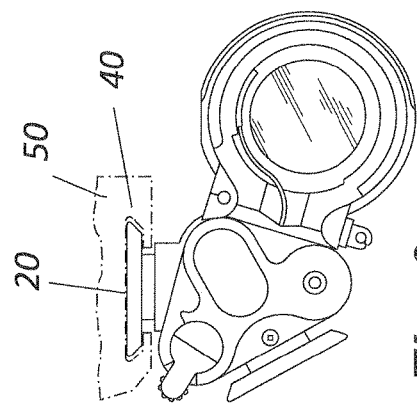
Figure 5A:
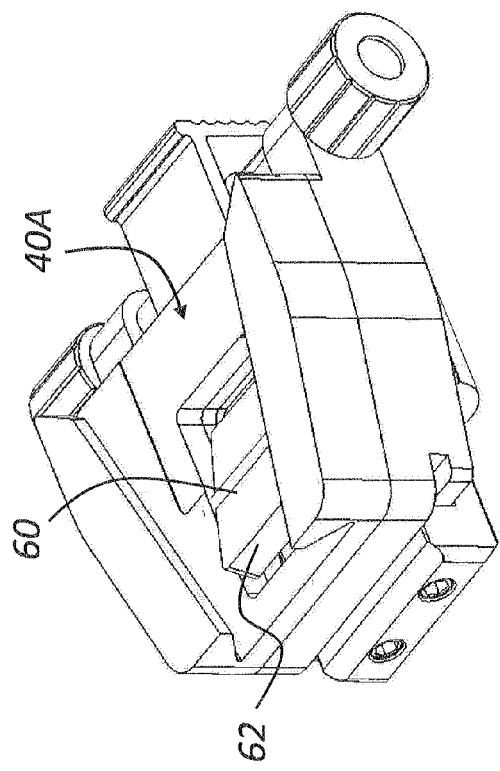
FIGS. 5A-5B are images of conventional receivers, in accordance with the prior art.

The shoe body 120 can be mounted to a surface 162 of a base plate 160 such that the surface 162 of the base plate 160 forms a base surface of one or more of the pockets 130, 132. For example, as shown in FIG. 7, the base surface 160 of the base plate 160 forms the floor of the first pocket 130 but does not form the floor of the second pocket 132, since it has a floor that is positioned higher than the base surface 162. The floor of the first pocket 130 may have a threaded receiving hole where the fastener 150 can be engaged with, such that the fastener 150 can retain the pocket insert 140 within the pocket 130. The overall thickness of the pocket insert 140 is less than the thickness of the pocket 130, thereby allowing for a rear-indexing retractable locking member of a receptacle, such as that shown in FIG. 5A, to engage with the pocket 130. The raised tooth 144 of the pocket insert 140 is sized to rise above the pocket insert 140, thereby providing an edge to the pocket 130 and a contact surface to engage with the rear-indexing retractable locking member.

Figure 5B:
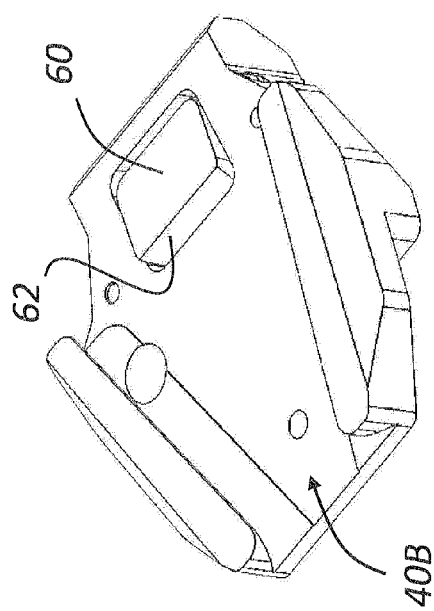
Figure 4:
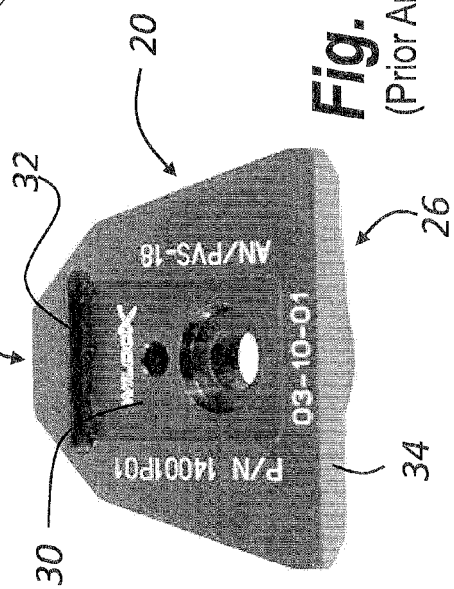
FIG. 4 is an image of a conventional mounting shoe, in accordance with the prior art.

The second pocket insert 142 may be positioned offset from the base surface 162 of the base plate 160, such that the height dimension of the second pocket insert 142 is less than a height dimension of the first pocket insert 140. The floor of the second pocket 132 may include a threaded receiving hole where the fastener 150 can be engaged with, such that the second pocket insert 142 can be secured within the second pocket 132 using the fastener 150. In contrast to the first pocket insert 140 used with a rear-indexing retractable locking member, the second pocket insert 142 is used to engage with a forward-indexing retractable locking member, such as one having the design of FIG. 5B. The ability to adjust the position of the second pocket insert 142, and in particular, the location of the forward edge 146 along an front-to-rear axis of the shoe body 120, allows for the shoe 110 to be adjusted to the desired positioned for any given forward-indexing receptacle, regardless of variables than conventionally lead to undesirable tight tolerances between the parts.

As can be seen in FIGS. 7-10D, the adjustable mounting shoe 110 may further include a guiding system which guides movement of the first and second pocket inserts 140, 142 within the rear or forward pocket 130, 132, respectively. The guiding system includes an angled slot 172 formed in the floor of the rear and forward pockets 130, 132, as shown in FIG. 9, which interfaces with an angled rail 174 which is formed on the bottom of each of the first and second pocket inserts 140, 142. For each of the first and second pocket inserts 140, 142, the rail 174 may engage the slot 172 when the pocket inserts 140, 142 are positioned within their respective pockets 130, 132. The rails 174 may generally be sized slightly shorter than the slots 172 within they are positioned, thereby allowing the rails 174 to slide from end to end while being guided along the edge of the slot-rail interface. This guiding system, which may be referred to by other names, such as a tab and slot system, may assist greatly with controlling the movement and/or positioning of the pocket inserts 140, 142. The rails 174 and slots 172 may be angled to match the angled design of the hole 148, such that the head of the fastener 150 can move within the hole 148 cavity when the pocket inserts 140, 142 are slid within the pockets 130, 132. It is noted that there are different structures that could be used to retain the pocket inserts 140, 142 within the pockets 130, 132 or guide the movement or positioning of the pocket inserts 140, 142, all of which are considered within the scope of the present disclosure. While the designs presented herein provide exemplary teachings of how to achieve an adjustable pocket inserts 140, 142 relative to the pockets 130, 132, other designs not included herein are also envisioned.

FIGS. 11A-11B are top view illustrations of the dual-adjustable mounting shoe 110 showing different pocket inserts 140, 142 positions, in accordance with the first exemplary embodiment of the present disclosure. The pocket inserts 140, 142 are movable and adjustable relative to the shoe body 120. The fastener 150 is engageable with the pocket inserts 140, 142 to secure the pocket insert 140 in a stationary position at least partially within the pockets 130, 132, respectively. In other words, when it is tightened, the fastener 150 may retain the pocket inserts 140, 142 stationary within the pockets 130, 132 and when it is loosened, the fastener 150 may allow the pocket inserts 140, 142 to have a variety of positions within the pockets 130, 132. When tightened, the fastener 150 may frictionally bias the pocket insert 140 to the upper surface 162 of the base plate 160, or pocket insert 142 to the floor of the pocket 132. Various types of fasteners 150 arranged in various ways may allow for movement of the pocket inserts 140, 142. For example, as is shown, a single fastener 150 may be positioned through a hole 148 in each of the pocket inserts 140, 142, which may be formed as an angled slot within the pocket inserts 140, 142. The portion of the hole 148 that the fastener 150 is located in may determine the position of the pocket inserts 140, 142 relative to the shoe body 120.

FIGS. 11A-11B depict at least two of the positions that the pocket inserts 140, 142 may have. For example, in FIG. 11A, when the fastener 150 is positioned in one side of the hole 148, i.e. the furthest right-hand point of the hole 148 for each of the pocket inserts 140, 142, the first pocket insert 140 is positioned in the retracted position, where the raised tooth 144 of the pocket insert 140 is positioned as retracted inwards towards the first pocket 130 to the greatest extent allowable by the hole 148. Similarly, when the fastener 150 is positioned to the furthest right-hand point of hole 148 in the second pocket insert 142, the second pocket insert 142 is positioned in the extended position, where the forward edge 146 of the second pocket insert 142 is positioned as extended outwards from the second pocket 132 as is allowed by the hole 148. In comparison, in FIG. 11B, the fastener is positioned towards the furthest left-hand position of the hole 148, which positions the first pocket insert 140 in the extended position and the second pocket insert 142 in the retracted position. A visual comparison of these two figures illustrates the difference of positions between the raised tooth 144 of the rear pocket insert 140 and the rear tips of the dovetail shoe body 120, as well as the difference in position between the forward edge 146 of the second pocket insert 142 an the forward or front edge of the shoe body 120 itself. While the difference of position may seem slight, the ability to adjust the location of the engaging surface (i.e., the raised tooth 144 of the forward edge 146) even a fraction of a millimeter can facilitate proper engagement of the shoe 110 with the receptacle.

The use of the angled slot as a hole 148 allows the pocket inserts 140, 142 to be movable relative to the shoe body 120 in at least two directions, if not more. For example, the pocket inserts 140, 142 are moveable in a first, forward/backward direction along the length of the pockets 130, 132 and pocket inserts 140, 142 as well as in a second direction, lateral to or parallel to the length of the pockets 130, 132 and the pocket inserts 140, 142. The ability for the pocket inserts 140, 142 to move in two substantially perpendicular directions translates into movements of the pocket inserts 140, 142 that enlarge the length of the pockets 130, 132 and move the raised tooth 144 or the forward edge 146 relative to the open edge of the respective pocket 130, 132. The movement of the pocket inserts 140, 142 lateral to the length of the pocket inserts 140, 142 may help prevent radial movement of the pocket inserts 140, 142 about the fastener 150, thereby keeping either the raised tooth 144 of the pocket inserts 140, 142 angled correctly relative to its respective pocket 130, 132.

While the fastener 150 and hole 148 of FIGS. 11A-11B have been provided as examples of how the pocket inserts 140, 142 can be moved to allow the shoe 120 to be adjustable, it is noted that other configurations for allowing movement of the pocket inserts 140, 142 are available. For example, instead of an angled slot as a hole 148, a vertical slot aligned along the length of the pocket inserts 140, 142 may be used. Any number of slots and fasteners 150 may be used. Additionally, a slot may be formed within the shoe body 120 or the base plate 160 instead of the pocket inserts 140, 142. Other designs for allowing the pocket inserts 140, 142 to be moved, adjusted, or relocated relative to the shoe body 120 are all considered within the scope of this disclosure.

FIGS. 12A-12B are bottom perspective views of the dual-adjustable mounting shoe and a rear-indexing receptacle, in accordance with the first exemplary embodiment of the present disclosure. As shown, the dual-adjustable mounting shoe 110 can be mounted to an appropriate receptacle 112, which commonly includes a receiving area having a retractable locking mechanism. In FIG. 12A, the shoe 110 is shown separated from the receptacle 112 with a broken arrow showing the path to engagement therebetween. In FIG. 12B, the shoe 110 has been engaged with the receptacle 112, such that the shoe 110 is positioned fully within the receiving area of the receptacle 112 and the retractable locking mechanism has engaged with the pocket (not visible) of the shoe 110.

FIG. 13 is a side cross-sectional view of the dual-adjustable mounting shoe and a rear-indexing receptacle 112, in accordance with the first exemplary embodiment of the present disclosure. In particular, FIG. 13 depicts the dual-adjustable mounting shoe in an engaged position with the rear-indexing receptacle 112, such that the shoe body 120 is positioned within a receiving structure 180 of the rear-indexing receptacle 112 and a retractable locking member 182 is engaged with the rear pocket insert 140. As shown, the retractable locking member 182 has descended below the upper plane of the shoe body 120 and in to the cavity formed in the top of the rear pocket insert 140, such that the distal end of the retractable locking member 182 can make contact with the raised tooth 144 of the rear pocket insert 140. In this position, the shoe body 120 is retained within the receiving area 180 of the rear-indexing receptacle 112. To disengage the connection, a user may depress one or more buttons 184 to release the retractable locking member 182, e.g., retract it upwards from the pocket insert 140 until there is adequate clearance to slide the shoe body 120 backwards from the receiving area 180.

As discussed in the background, some components may be constructed with poor quality, such that components intended to engage together do not do so, especially with conventional shoes intended to universally fit with various mounting structures. While the conventional shoe may fit properly some of the time, or with some products, the pocket of the shoe is often in the wrong location, thereby causing the retractable locking member to not fit properly with the pocket. Thus, the conventional shoe may be fully positioned within the receiving pocket, yet the retractable locking member may not be capable of engaging with the pocket. The dual-adjustable mounting shoe 110 solves this problem by allowing the pocket 130 to be enlarged, thereby effectively allowing the pocket 130 to adjust to the position of the retractable locking member 182. The pocket 130 is enlarged by releasing the fastener 150, moving the pocket insert 140 to a different location within the pocket 130, and then securing the pocket insert 140 in place by tightening the fastener 150. This adjustment moves the raised tooth 144 to enlarge the pocket, thereby allowing the retractable locking member 182 to engage with the raised tooth 144.

Figure 10A:
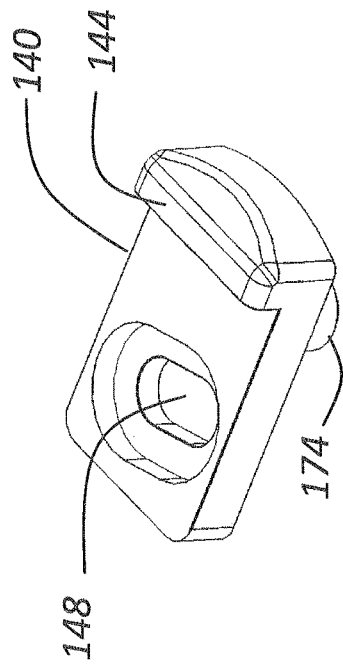
FIGS. 10A-10D are various isometric views of the rear and forward pocket inserts of the dual-adjustable mounting shoe, in accordance with the first exemplary embodiment of the present disclosure.
Figure 10C:
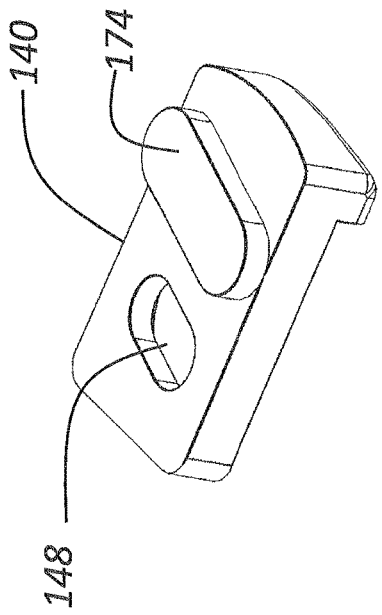
Figure 10B:
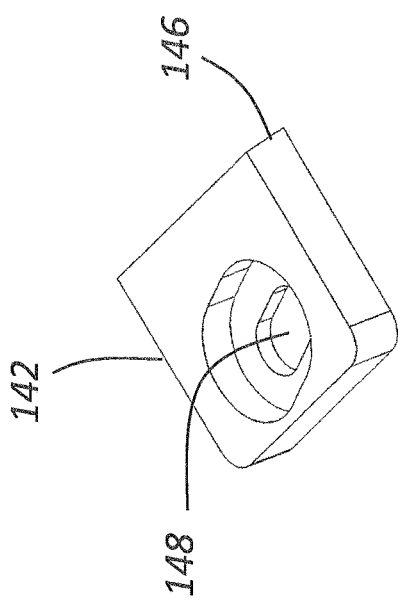
Figure 10D:
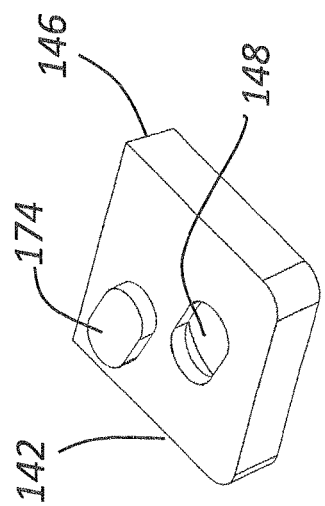

FIGS. 14A-14B are a bottom perspective view and side cross-sectional view of the dual-adjustable mounting shoe and a forward-indexing receptacle 144, in accordance with the first exemplary embodiment of the present disclosure. As can be seen, the dual-adjustable mounting shoe 110 of FIGS. 14A-14B is similar to that discussed in FIGS. 12A-13 with the difference being that in FIGS. 14A-14B, a forward-indexing receptacle 114 is used. In the forward-indexing receptacle 114, the retractable locking member 182 is positioned largely in front of the receiving area 180, such that the shoe body 120 is inserted into the receiving area 180 fully and the retractable locking member 182 engages with the forward edge 146 of the forward pocket insert 142. Accordingly, the same concept of adjusting the position of the pocket insert is used with a forward-indexing receptacle 114 with the difference that the forward pocket insert 142, not the rear pocket insert 140, is adjusted to provide the proper engagement with the retractable locking member 182. Thus, the fastener 150 can be released, the forward pocket insert 142 can be moved within the forward pocket 132, and then the fastener 150 is secured to immobilize the forward pocket insert 142 in the desired location where the distal end of the retractable locking member 182 can engage with the forward edge 146 of the forward pocket insert 142, and released therefrom upon actuation of button 184. It is noted that the forward edge 146 may be angled to allow for a better engagement with the retractable locking member 182. This angle may include an obtuse angle as measured between a top plane of the forward pocket insert 142 and the forward edge 146, as is also shown in FIGS. 10A-10B.

It is noted that the use of the first and second pocket inserts 140, 142 as separate members may have particular benefits to allow a single shoe body 120 to be used with difference receptacles which may have different fits without the constant need for a user to adjust the positioning of both structures. For example, a user may use a single shoe to mount an optical device to a combat helmet with a rear-indexing receptacle and to a weapon with a forward-indexing receptacle. Once the specific locations of the first and second pocket inserts 140, 142 are selected, usually upon initial set-up, the user can use the single shoe without the need for readjustments.

FIG. 15 is an angled side view illustration of a dual-adjustable mounting shoe 210, in accordance with a second exemplary embodiment of the present disclosure. FIG. 16 is an isometric, exploded view illustration of the dual-adjustable mounting shoe 210 of FIG. 15, in accordance with the second exemplary embodiment of the present disclosure. The dual-adjustable mounting shoe 210 of FIGS. 15-16 is similar to the dual-adjustable mounting shoe 110 of FIGS. 6-14B with the exception of the rear and forward pocket inserts 140, 142 discussed relative to FIGS. 6-14B are combined into one unitary pocket insert 240 in FIGS. 15-16. Specifically, the pocket insert 240 is positionable within the pocket 230 of the shoe body 220 and extends from the rear side thereof, proximate to the positioning of the raised tooth 244, to the forward side thereof, proximate to the location of the forward edge 246, such that readjusting the position of the pocket insert 240 moves the location of the raised tooth 244 and the forward edge 246 together. Accordingly, as shown, the pocket insert 240 may have a structure which fits within a pocket 230 which runs substantially the length of the shoe body 220 itself, where the ends of the pocket insert 240 have a height that is substantially coplanar with an upper surface of the shoe body 220, and a middle section of the pocket insert 240 has a cavity formed therein to allow engagement between a rear-indexing retractable locking mechanism and the raised tooth 244. It is noted that the dual-adjustable mounting shoe 210 may include any of the other features, components, and functions as discussed relative to FIGS. 6-14B, including holes and fasteners 250, guiding systems, an angled forward face 246, a base plate, and other features.

FIGS. 17A-17B are top view illustrations of the dual-adjustable mounting shoe 210 showing the pocket insert 240 in different positions, in accordance with the second exemplary embodiment of the present disclosure. The pocket insert 240 is movable and adjustable relative to the shoe body 220. The fastener (not shown) is engageable with the pocket insert 240 through the hole 248 to secure the pocket insert 140 in a stationary position at least partially within the pocket 130. In other words, when it is tightened, the fastener may retain the pocket insert 240, stationary within the pocket and when it is loosened, the fastener may allow the pocket insert 240 to have a variety of positions within the pocket 230. When tightened, the fastener may frictionally bias the pocket insert 240 to the upper surface 262 of the base plate 260. Various types of fasteners arranged in various ways may allow for movement of the pocket insert 240. For example, a single fastener may be positioned through a hole 248 in the pocket insert 240, which may be formed as an angled slot within the pocket insert 240. The portion of the hole 248 that the fastener is located in may determine the position of the pocket insert 240 relative to the shoe body 220.

FIGS. 17A-17B depict at least two of the positions the pocket insert 240 may have. For example, in FIG. 17A, the pocket insert 240 is positioned in the retracted position for the rear thereof, e.g., for the raised tooth 244 at the rear of the pocket insert 240, and is positioned in an extended position for the front thereof, e.g., at a front of the pocket insert 240 where the forward face 246 is located. FIG. 17B illustrates the opposite position, where the raised tooth 244 at the rear of the pocket insert 240 is in the extended position and the forward edge 246 of the pocket insert 240 is in the retracted position. A visual comparison of these two figures illustrates the difference of positions between the raised tooth 244 of the pocket insert 240 and the rear tips of the dovetail shoe body 220, as well as the difference in position between the forward edge 246 of the pocket insert 240 and the forward or front edge of the shoe body 220 itself. While the difference of position may seem slight, the ability to adjust the location of the engaging surface (i.e., the raised tooth 244 of the forward edge 246) even a fraction of a millimeter can facilitate proper engagement of the shoe 210 with the receptacle.

FIG. 18 is a side cross-sectional view of the dual-adjustable mounting shoe and a rear-indexing receptacle 212, in accordance with the second exemplary embodiment of the present disclosure. In particular, FIG. 18 depicts the dual-adjustable mounting shoe in an engaged position with the rear-indexing receptacle 212, such that the shoe body 220 is positioned within a receiving structure 280 of the rear-indexing receptacle 212 and a retractable locking member 282 is engaged with the pocket insert 240. As shown, the retractable locking member 282 has descended below the upper plane of the shoe body 220 and into the cavity formed in the top of the pocket insert 240, such that the distal end of the retractable locking member 282 can make contact with the raised tooth 244 of the pocket insert 240. In this position, the shoe body 220 is retained within the receiving area 280 of the rear-indexing receptacle 212. To disengage the connection, a user may depress one or more buttons 284 to release the retractable locking member 282, e.g., retract it upwards from the pocket insert 240 until there is adequate clearance to slide the shoe body 220 backwards from the receiving area 280.

FIG. 19 is a side cross-sectional view of the dual-adjustable mounting shoe 210 and a forward-indexing receptacle 214, in accordance with the second exemplary embodiment of the present disclosure. As can be seen, the dual-adjustable mounting shoe 210 of FIG. 19 is similar to that discussed in FIG. 18 with the difference being that in FIG. 19, a forward-indexing receptacle 214 is used. In the forward-indexing receptacle 214, the retractable locking member 282 is positioned largely in front of the receiving area 280, such that the shoe body 220 is inserted into the receiving area 280 fully and the retractable locking member 282 engages with the forward edge 246 of the pocket insert 240. Accordingly, the same concept of adjusting the position of the pocket insert is used with a forward-indexing receptacle 214 with the difference that the pocket insert 240 is adjusted to provide an engagement between the retractable locking member 282 and the forward edge 246 of the pocket insert 240. Thus, the fastener 250 can be released, the pocket insert 240 can be moved within the pocket 230, and then the fastener 250 is secured to immobilize the pocket insert 240 in the desired location where the distal end of the retractable locking member 282 can engage with the forward edge 246 of the pocket insert 240, and released therefrom upon actuation of button 284. Similar to as previously discussed, the forward edge 246 may be angled to allow for a better engagement with the retractable locking member 282. This angle may include an obtuse angle as measured between a top plane of the pocket insert 240 and the forward edge 246.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A dual-adjustable mounting shoe comprising:
   a shoe body;
   a middle portion of the shoe body having at least one pocket formed therein;
   at least one pocket insert positioned at least partially within the pocket, the pocket insert having a raised tooth positioned along a rear of the shoe body and a forward edge positioned along a front of the shoe body, wherein the at least one pocket insert is movable relative to the shoe body to adjust a position of at least one of the raised tooth and the forward edge relative to the shoe body; and
   at least one fastener engageable with the at least one pocket insert to secure the at least one pocket insert in a stationary position at least partially within the pocket.

2. The adjustable mounting shoe of claim 1, further comprising a base plate, wherein the shoe body is mounted to a surface of the base plate.

3. The adjustable mounting shoe of claim 2, wherein the surface of the base plate further comprises a base surface of the pocket, wherein the at least one pocket insert is securable to the base surface of the pocket.

4. The adjustable mounting shoe of claim 3, wherein the at least one fastener further comprises a threaded fastener engaged between the at least one pocket insert and the base surface of the pocket.

5. The adjustable mounting shoe of claim 1, wherein a plane of a base surface of the pocket is oriented substantially perpendicular to a plane of all sidewalls of the pocket.

6. The adjustable mounting shoe of claim 1, wherein the raised tooth of the pocket insert forms at least one edge of the pocket.

7. The adjustable mounting shoe of claim 1, wherein the at least one pocket insert is movable relative to the shoe body in at least a first direction and a second direction, wherein the first direction is substantially perpendicular to the second direction.

8. The adjustable mounting shoe of claim 1, further comprising a guiding system engagable with the at least one pocket insert to guide movement of the at least one pocket insert within the pocket.

9. The adjustable mounting shoe of claim 1, wherein the pocket insert further comprises a body portion connected to the raised tooth, wherein a height of the body portion is less than a height of the raised tooth.

10. The adjustable mounting shoe of claim 9, wherein the height of the body portion of the pocket insert is less than a height of the shoe body.

11. The adjustable mounting shoe of claim 1, wherein the at least one pocket insert further comprises a hole formed therein, wherein the at least one fastener is positioned through the hole, and wherein a head of the at least one fastener is positioned below a top surface of the at least one pocket insert.

12. A dual-adjustable mounting shoe comprising:
a shoe body;
a middle portion of the shoe body having a rear pocket and a forward pocket formed therein;
a first pocket insert positioned at least partially within the rear pocket, the first pocket insert having a raised tooth positioned along a rear of the shoe body, wherein the first pocket insert is movable relative to the shoe body to adjust a position of the raised tooth relative to the shoe body;
a second pocket insert positioned at least partially within the forward pocket, the second pocket insert having a forward edge positioned proximate to a front edge of the shoe body, wherein the second pocket insert is movable relative to the shoe body to adjust a position of the forward edge relative to the shoe body; and
at least one fastener engageable with each of the first and second pocket inserts, respectively, to secure the first and second pocket inserts in a stationary position at least partially within the pocket.

13. The dual-adjustable mounting shoe of claim 12, wherein each of the first pocket insert and the second pocket insert are independently movable.

14. The dual-adjustable mounting shoe of claim 12, wherein the forward edge of the second pocket insert is formed at an obtuse angle relative to a top plane of the second pocket insert.

15. The dual-adjustable mounting shoe of claim 12, wherein each of the first and second pocket inserts further comprise a guiding system engagable between a bottom surface of the first and second pocket inserts and a floor of the rear and forward pockets, respectively, wherein the guiding system guides a movement of the first and second pocket inserts in at least one direction.

16. The dual-adjustable mounting shoe of claim 12, wherein the second pocket insert has a thickness dimension that is greater than a thickness dimension of the first pocket insert.

17. The dual-adjustable mounting shoe of claim 12, wherein an upper surface of the second pocket insert is substantially coplanar with an upper surface of the shoe body.

18. The dual-adjustable mounting shoe of claim 12, wherein the shoe body further comprises a pocket-separation wall positioned between the rear and forward pockets.

* * * * *